(12) United States Patent
Morita et al.

(10) Patent No.: US 8,213,153 B2
(45) Date of Patent: Jul. 3, 2012

(54) DIELECTRIC CERAMIC AND LAMINATED CERAMIC CAPACITOR

(75) Inventors: Megumi Morita, Nagaokakyo (JP); Shoichiro Suzuki, Yasu (JP); Toshikazu Takeda, Omihachiman (JP); Tomomi Koga, Yasu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 210 days.

(21) Appl. No.: 12/695,548

(22) Filed: Jan. 28, 2010

(65) Prior Publication Data

US 2010/0195266 A1 Aug. 5, 2010

(30) Foreign Application Priority Data

Jan. 30, 2009 (JP) .................................. 2009-019694

(51) Int. Cl.
*H01G 4/06* (2006.01)
(52) U.S. Cl. ............... 361/321.4; 361/321.1; 361/321.2; 361/321.5; 361/311; 361/313

(58) Field of Classification Search ............... 361/321.4, 361/311–313, 321.1, 321.2, 321.5, 306.1, 361/306.3
See application file for complete search history.

(56) References Cited

U.S. PATENT DOCUMENTS

| 5,723,395 A * | 3/1998 | Suzuki et al. ................. 501/134 |
| 6,740,614 B2 * | 5/2004 | Kim et al. ..................... 501/139 |
| 7,378,363 B2 * | 5/2008 | Zheng et al. ................. 501/136 |
| 7,595,975 B2 * | 9/2009 | Suzuki et al. .............. 361/321.4 |

FOREIGN PATENT DOCUMENTS

| JP | 2002-80278 |   | 3/2002 |
| JP | 2005-200232 | A | 7/2005 |
| JP | 2008-004393 | A | 1/2008 |
| JP | 2008-068999 | A | 3/2008 |

* cited by examiner

*Primary Examiner* — Nguyen T Ha
(74) *Attorney, Agent, or Firm* — Dickstein Shapiro LLP

(57) ABSTRACT

A dielectric ceramic with stable insulation properties even after calcination under a reducing atmosphere, as is preferred for a laminated ceramic capacitor, is a $CaTiO_3$ composition containing Sn. It is preferable for the dielectric ceramic to contain, as its main component, $(Ca_{1-x}Ba_xSn_y)TiO_3$ ($0 \leq x < 0.2$, $0.01 \leq y < 0.2$) with a solution of Sn at the B site.

20 Claims, 1 Drawing Sheet

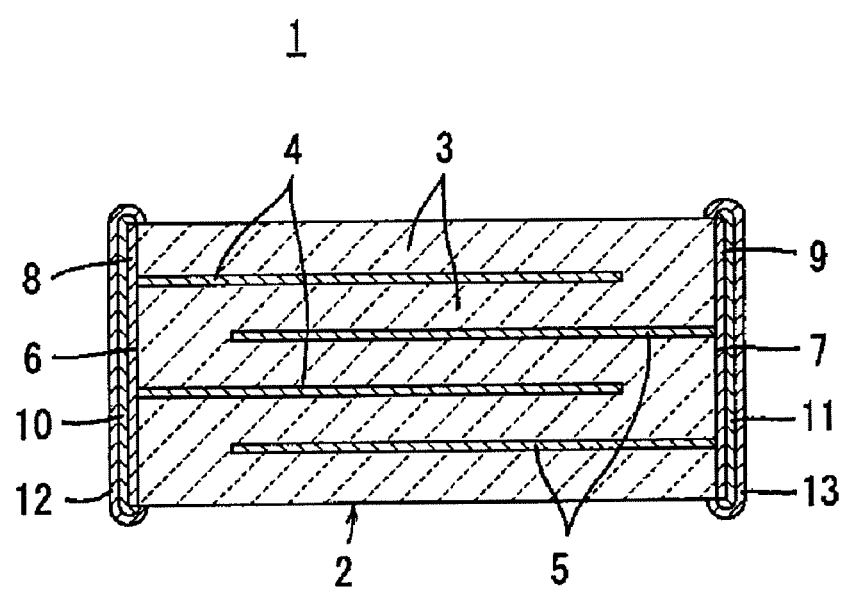

DIELECTRIC CERAMIC AND LAMINATED CERAMIC CAPACITOR

BACKGROUND OF THE INVENTION

1. Field of the Invention

The present invention relates to a dielectric ceramic, and a laminated ceramic capacitor configured with the use of the dielectric ceramic.

2. Description of the Related Art

Laminated ceramic capacitors, a major applications of the present invention, are commonly manufactured as follows.

First, a ceramic green sheet containing a dielectric ceramic raw material is prepared whose surface is provided with a conductive material to serve as internal electrodes with a predetermined pattern.

Next, a plurality of ceramic green sheets including ceramic green sheets provided with the conductive material are laminated and subjected to thermocompression bonding, thereby manufacturing an integrated raw (green) laminated body.

Next, this raw laminated body is calcined, thereby obtaining a calcined laminated body. Internal electrodes composed of the conductive material described above are formed in this laminated body.

Then, external electrodes are formed on the outer surfaces of the laminated body so as to be electrically connected to specific one of the internal electrodes. The external electrodes are formed, for example, by providing a conductive paste containing conductive metal powder and glass frit onto the outer surfaces of the laminated body and baking the conductive paste. In this way, a laminated ceramic capacitor is completed.

It is desirable in the laminated ceramic capacitors to use inexpensive Ni for the internal electrodes, in order to reduce the manufacturing cost. Since Ni is a base metal, the atmosphere for calcination needs to be brought into a reducing atmosphere condition in order to prevent Ni from being oxidized during the calcination of the laminated body.

In order to carry out the calcination in a reducing atmosphere, the dielectric ceramic material is required to have resistance to reduction. As a material which exhibits a certain level of insulation properties even after calcination under a reducing atmosphere, Japanese Patent Application Laid-Open No. 2002-80278 (Patent Document 1) discloses ceramic compositions of the (Sr, Ca)(Ti, Zr)O$_3$ type.

SUMMARY OF THE INVENTION

However, it is necessary in the case of the dielectric ceramics described in Patent Document 1, to employ one or more oxides of V, Nb, W, Ta, and Mo and/or compounds which are converted to these oxides after calcination as an accessory component, in order to ensure both insulation properties and reliability are realized, and the dielectric ceramics have the problem that slight variation in the content of this compound significantly varies the electrical characteristics.

Therefore, an object of the present invention is to provide a dielectric ceramic which has sufficiently high insulation properties even after calcination in a reducing atmosphere and shows stable values of its electrical characteristics with respect to compositional variations.

That is, the present invention is a dielectric ceramic containing $(Ca_{1-x}Ba_x)TiO_3$ ($0 \leq x < 0.2$) as its main component and Sn at 1 part by mol or more and less than 20 parts by mol with respect to 100 parts by mol of the main component.

Further, the present invention is preferably a dielectric ceramic containing $(Ca_{1-x-y}Ba_xSn_y)TiO_3$ ($0 \leq x < 0.2$, $0.01 \leq y < 0.2$) as its main component.

In addition, the present invention is directed to a laminated ceramic capacitor containing a laminated body including a plurality of laminated dielectric ceramic layers and internal electrodes formed along interfaces between the dielectric ceramic layers, and external electrodes formed on the outer surface of the laminated body so as to be electrically connected to specific ones of the internal electrodes, wherein the dielectric ceramic layers of the present invention.

According to the present invention, dielectric ceramics can be obtained which have sufficiently high insulation properties even after calcination in a reducing atmosphere and show stable values of the electrical characteristics.

Furthermore, the dielectric ceramic according to the present invention has great resistance to reduction, thereby allowing Ni to be used for the internal electrodes of the laminated ceramic capacitors, and thus allowing low-cost laminated ceramic capacitors to be obtained.

BRIEF DESCRIPTION OF THE DRAWINGS

FIG. 1 is a cross-sectional view schematically illustrating a laminated ceramic capacitor 1 according to an embodiment of the invention.

DETAILED DESCRIPTION OF THE INVENTION

FIG. 1 is a cross-sectional view illustrating a laminated ceramic capacitor 1 according to an embodiment of the invention.

The laminated ceramic capacitor 1 includes a laminates body 2. The laminated body 2 is composed of a plurality of laminated dielectric ceramic layers 3 and a plurality of internal electrodes 4 and 5 along a plurality of specific interfaces between dielectric ceramic layers 3.

The internal electrodes 4 and 5 preferably contain Ni as their main component. The internal electrodes 4 and 5 are formed to reach the outer surfaces of the laminated body 2, in such a way that the internal electrodes 4 extend to one edge surface 6 of the laminated body 2 and the internal electrodes 5 extend to the other edge surface 7 are alternated arranged inside the laminated body 2.

External electrodes 8 and 9 are formed respectively on the edge surfaces 6 and 7 as the outer surfaces of the laminated body 2. The external electrodes 8 and 9 are formed, for example, by applying and baking a conductive paste containing Cu as its main component. The external electrode 8 is electrically connected to the internal electrodes 4 on the edge surface 6, whereas the other external electrode 9 is electrically connected to the internal electrode 5 on the edge surface 7.

If necessary, in order to provide favorable solderability, first plating films 10 and 11 composed of Ni or the like are formed on the external electrodes 8 and 9, and second plating films 12 and 13 composed of Sn or the like are further formed thereon.

In this laminated ceramic capacitor 1, the dielectric ceramic layers 3 contains, as their main component, a perovskite compound represented by a formula $(Ca_{1-x}Ba_x)TiO_3$ ($0 \leq x < 0.2$), and contains 1 part by mol or more and less than 20 parts by mol of Sn with respect to 100 parts by mol of $(Ca_{1-x}Ba_x)TiO_3$. The Sn in an amount of 1 part by mol or more improves the insulation resistivity. When Sn is contained in an amount of 20 parts by mol or more, the dielectric constant ∈ will be lowered, which is not desirable. Furthermore, in a similar way, the Ba content x of 0.2 or more will lower the insulation resistivity, which is also not desirable.

The Sn a bivalent cation may be substituted at the Ca site or as a quadrivalent cation at the Ti site, or may be located at a grain boundary or may form secondary phase grains differing from the perovskite compound without departing from the object of the present invention.

The present invention preferably provides a dielectric ceramic containing, as its main component, $(Ca_{1-x-y}Ba_xSn_y)TiO_3$ ($0 \leq x < 0.2$, $0.01 \leq y < 0.2$) in which Sn is substituted as a bivalent cation at the Ca site. A Sn content y of 0.01 or more ensures a higher insulation resistivity. A Sn content y of 0.2 or more lowers the dielectric constant $\in$, which is not desirable. Furthermore, in a similar way, a Ba content x of 0.2 or more lowers the insulation resistivity, which is also not desirable. The molar ratio of Ca site/Ti site of the perovskite may vary within a relatively wide range with 1 as a central value, and in particular, preferably on the order of 0.93 to 1.03.

The normal solid phase method can be used to manufacture the $(Ca_{1-x-y}Ba_xSn_y)TiO_3$ dielectric ceramic. However, it is preferable to bring the atmosphere into a reducing atmosphere condition for the synthesis of $(Ca_{1-x-y}Ba_xSn_y)TiO_3$ and for sintering of the ceramic, in order to produce a stable bivalent cation form of Sn.

It is to be noted that the evaluation of the valence of the Sn by XANES measurement can be carried out by a transmission method at the Sn—K absorption edge to evaluate the valance from the chemical shift of the absorption edge. In general, a larger valence shifts the absorption edge to the higher energy side, and this shift can be compared with Sn, SnO, and $SnO_2$ as references to identify the valence. It is to be noted that other methods which are able to identify the valence, such as TEM-EELS and ESR, may be used to detect the valence.

EXAMPLES

Next, experimental examples carried out for confirming advantageous effects of the invention will be described.

Experimental Example 1

First, $CaCO_3$, $BaCO_3$, $TiO_2$, and $SnO_2$ powders were prepared as starting materials for a main component. These powders were weighed to have the values of x and y shown in Table 1 in the composition $(Ca_{1-x}Ba_x)(Ti_{1-y}Sn_y)O_3$, and mixed in a ball mill with water as a solvent. Then, after drying, calcination was carried out at a temperature of 800 to 1000° C. in the atmosphere for 2 hours, thereby obtaining a ceramic raw material.

Next, a polyvinyl butyral binder and an organic solvent such as ethanol were added to this ceramic raw material powder for mixing in a ball mill, obtaining preparing ceramic slurry. The ceramic slurry was subjected to sheet forming by the doctor blade method to obtain a ceramic green sheet.

Next, a conductive paste containing Ni as its main component was screen-printed on the ceramic green sheet to form a conductive paste film to serve as an internal electrode. Then, ceramics green sheets having this conductive paste films were laminated so that the opposed sides to which the conductive paste films extended were alternated, thereby obtaining a raw laminated body.

Next, the raw laminated body was heated to a temperature of 300° C. in a nitrogen atmosphere to burn off the binder, and then calcined at the oxygen partial pressure and calcination temperature shown in Table 1 for 2 hours to obtain a sintered laminated body. This laminated body includes the dielectric layers obtained by calcining the ceramic green sheets and the internal electrodes obtained by calcining the conductive paste films.

A silver paste containing $B_2O_3$—$SiO_2$—BaO glass frit was applied to the opposed edge surfaces of the calcined laminated body, and baked at a temperature of 800° C. in a nitrogen atmosphere to form external electrodes electrically connected to the internal electrodes.

The laminated ceramic capacitor thus obtained had outer dimensions of a length 2.0 mm, a width 1.0 mm, and a thickness 1.0 mm, and the thickness of the dielectric ceramic layer interposed the internal electrodes was 7 μm. Further, the number of dielectric ceramic layers effective for capacitance formation was 5, and the area of the opposed electrode per dielectric ceramic layer was 1.7 $mm^2$.

The dielectric constant $\in$ for the dielectric ceramics constituting the dielectric ceramic layers in the laminated ceramic capacitors according to the respective samples described above were measured under the conditions of 25° C., 1 kHz, and 1 $V_{rms}$.

Next, the resistivity ρ of the dielectric ceramics constituting the dielectric ceramic layers was obtained from the insulation resistance measured by charging a voltage of 100 V at a temperature of 25° C. for 120 seconds.

The results of the dielectric constant $\in$ and the logarithm log ρ of the resistivity are shown in Table 1.

TABLE 1

| Sample Number | x | y | Calcination Temperature (° C.) | Oxygen Partial Pressure (MPa) | Log (ρ/Ω·m) | ∈ |
|---|---|---|---|---|---|---|
| 1 | 0 | 0 | 1350 | $1 \times 10^{-2}$ | 9.8 | 146 |
| 2 | 0 | 0.01 | 1275 | $1 \times 10^{-2}$ | 10.9 | 182 |
| 3 | 0 | 0.03 | 1250 | $1 \times 10^{-2}$ | 11.0 | 163 |
| 4 | 0 | 0.05 | 1250 | $1 \times 10^{-2}$ | 11.3 | 145 |
| 5 | 0 | 0.08 | 1250 | $1 \times 10^{-2}$ | 11.6 | 117 |
| 6 | 0 | 0.1 | 1250 | $1 \times 10^{-2}$ | 11.8 | 110 |
| 7 | 0 | 0.15 | 1225 | $1 \times 10^{-2}$ | 12.1 | 51 |
| 8 | 0 | 0.2 | 1200 | $1 \times 10^{-2}$ | 12.5 | 30 |
| 9 | 0.01 | 0.1 | 1275 | $1 \times 10^{-2}$ | 11.9 | 108 |
| 10 | 0.03 | 0.1 | 1250 | $1 \times 10^{-2}$ | 12.0 | 106 |
| 11 | 0.05 | 0.1 | 1250 | $1 \times 10^{-2}$ | 11.8 | 110 |
| 12 | 0.08 | 0.1 | 1250 | $1 \times 10^{-2}$ | 11.9 | 115 |
| 13 | 0.1 | 0.1 | 1250 | $1 \times 10^{-2}$ | 11.6 | 124 |
| 14 | 0.15 | 0.1 | 1225 | $1 \times 10^{-2}$ | 10.6 | 129 |
| 15 | 0.2 | 0.1 | 1200 | $1 \times 10^{-2}$ | 6.5 | 137 |
| 16 | 0.1 | 0.01 | 1275 | $1 \times 10^{-2}$ | 11.0 | 181 |
| 17 | 0.1 | 0.03 | 1250 | $1 \times 10^{-2}$ | 11.4 | 166 |
| 18 | 0.1 | 0.05 | 1250 | $1 \times 10^{-2}$ | 11.5 | 154 |
| 19 | 0.1 | 0.08 | 1250 | $1 \times 10^{-2}$ | 11.9 | 133 |
| 20 | 0.1 | 0.1 | 1250 | $1 \times 10^{-2}$ | 11.6 | 124 |
| 21 | 0.1 | 0.15 | 1225 | $1 \times 10^{-2}$ | 12.2 | 52 |
| 22 | 0.1 | 0.2 | 1200 | $1 \times 10^{-2}$ | 12.5 | 30 |

Sample numbers 2 to 7, 9 to 14, 16 to 21 are within the scope of the present invention and provided high insulation properties with log ρ of 10 or more.

While the samples of sample numbers 8 and 22 containing 0.2 Sn provided a certain level of insulation properties, the dielectric constant $\in$ was less than 50. Furthermore, the sample number 15 containing 0.2 Ba resulted in low log ρ.

Experimental Example 2

First, $CaCO_3$, $BaCO_3$, $TiO_2$, and $SnO_2$ powders were prepared as starting materials for a main component. These powders were weighed to have the values of x and y in Table 2 in the composition $(Ca_{1-x-y}Ba_xSn_y)TiO_3$, and mixed in a ball mill with water as a solvent. Then, after drying, calcination was carried out at a temperature of 900 to 1000° C. in a reducing atmosphere with an oxygen partial pressure of $1.0 \times 10^{-11}$ MPa in the atmosphere for 2 hours, thereby obtaining a ceramic raw material.

The obtained ceramic raw material was used to manufacture laminated ceramic capacitors in the same way as in Experimental Example 1. The calcination temperature and the oxygen partial pressure for calcination are as shown in Table 2.

For the laminated ceramic capacitors obtained, the dielectric constant $\in$ and the resistivity $\rho$ were obtained in the same way as in Experimental Example 1.

TABLE 2

| Sample Number | x | y | Calcination Temperature (° C.) | Oxygen Partial Pressure (MPa) | Log ($\rho/\Omega \cdot$ m) | $\epsilon$ |
|---|---|---|---|---|---|---|
| 101 | 0 | 0 | 1350 | $1 \times 10^{-11}$ | 9.8 | 146 |
| 102 | 0 | 0.01 | 1275 | $1 \times 10^{-11}$ | 11.1 | 217 |
| 103 | 0 | 0.03 | 1250 | $1 \times 10^{-11}$ | 11.8 | 174 |
| 104 | 0 | 0.05 | 1250 | $1 \times 10^{-11}$ | 12.1 | 166 |
| 105 | 0 | 0.08 | 1250 | $1 \times 10^{-11}$ | 12.6 | 131 |
| 106 | 0 | 0.1 | 1250 | $1 \times 10^{-11}$ | 12.9 | 106 |
| 107 | 0 | 0.15 | 1225 | $1 \times 10^{-11}$ | 13.1 | 94 |
| 108 | 0 | 0.2 | 1200 | $1 \times 10^{-11}$ | 13.5 | 35 |
| 109 | 0.01 | 0.1 | 1275 | $1 \times 10^{-11}$ | 13.2 | 102 |
| 110 | 0.03 | 0.1 | 1250 | $1 \times 10^{-11}$ | 13.1 | 109 |
| 111 | 0.05 | 0.1 | 1250 | $1 \times 10^{-11}$ | 12.9 | 114 |
| 112 | 0.08 | 0.1 | 1250 | $1 \times 10^{-11}$ | 12.5 | 118 |
| 113 | 0.1 | 0.1 | 1250 | $1 \times 10^{-11}$ | 12.4 | 125 |
| 114 | 0.15 | 0.1 | 1225 | $1 \times 10^{-11}$ | 10.9 | 136 |
| 115 | 0.2 | 0.1 | 1200 | $1 \times 10^{-11}$ | 7.1 | 151 |
| 116 | 0.1 | 0.01 | 1275 | $1 \times 10^{-11}$ | 11.0 | 189 |
| 117 | 0.1 | 0.03 | 1250 | $1 \times 10^{-11}$ | 11.3 | 181 |
| 118 | 0.1 | 0.05 | 1250 | $1 \times 10^{-11}$ | 11.9 | 169 |
| 119 | 0.1 | 0.08 | 1250 | $1 \times 10^{-11}$ | 12.2 | 133 |
| 120 | 0.1 | 0.1 | 1250 | $1 \times 10^{-11}$ | 12.4 | 125 |
| 121 | 0.1 | 0.15 | 1225 | $1 \times 10^{-11}$ | 13.0 | 87 |
| 122 | 0.1 | 0.2 | 1200 | $1 \times 10^{-11}$ | 13.7 | 42 |

Sample numbers 102 to 107, 109 to 114, 116 to 121 are within the scope of the present invention and provided higher insulation properties with log $\rho$ of 10.9 or more.

While the samples of sample numbers 108 and 122 containing 0.2 Sn provided a certain level of insulation properties, the dielectric constant $\in$ was less than 50. Sample number 115 containing 0.2 Ba resulted in low log $\rho$.

The dielectric ceramics according to the present invention and the laminated ceramic capacitors using the dielectric ceramics are useful as capacitative elements in a variety of electronic circuits.

What is claimed is:

1. A dielectric ceramic comprising as its main component, $(Ca_{1-x}Ba_x)TiO_3$ in which $0 \leq x < 0.2$ and Sn in an amount of 1 to less than 20 parts by mol with respect to 100 parts by mol of the main component.

2. The dielectric ceramic according to claim 1 whose main component comprises $(Ca_{1-x-y}Ba_xSn_y)TiO_3$ in which $0 \leq x < 0.2$, and $0.01 \leq y < 0.2$.

3. The dielectric ceramic according to claim 2 in which $x < 0.15$, and $y < 0.15$.

4. The dielectric ceramic according to claim 3 in which the molar ratio of $(Ca_{1-x-y}Ba_xSn_y)$ to Ti is 0.93 to 1.03.

5. A laminated ceramic capacitor comprising:
a laminated body including a plurality of laminated dielectric ceramic layers with internal electrodes disposed at different interfaces between adjacent dielectric ceramic layers, and a pair of external electrodes disposed on an outer surface of the laminated body so that each is electrically connected to a different internal electrodes,
wherein the dielectric ceramic layers comprise the dielectric ceramic according to claim 4.

6. The laminated ceramic capacitor according to claim 5, wherein the internal electrodes comprise Ni.

7. The dielectric ceramic according to claim 2 in which the molar ratio of $(Ca_{1-x-y}Ba_xSn_y)$ to Ti is 0.93 to 1.03.

8. A laminated ceramic capacitor comprising:
a laminated body including a plurality of laminated dielectric ceramic layers with internal electrodes disposed at different interfaces between adjacent dielectric ceramic layers, and a pair of external electrodes disposed on an outer surface of the laminated body so that each is electrically connected to a different internal electrodes,
wherein the dielectric ceramic layers comprise the dielectric ceramic according to claim 7.

9. A laminated ceramic capacitor comprising:
a laminated body including a plurality of laminated dielectric ceramic layers with internal electrodes disposed at different interfaces between adjacent dielectric ceramic layers, and a pair of external electrodes disposed on an outer surface of the laminated body so that each is electrically connected to a different internal electrodes,
wherein the dielectric ceramic layers comprise the dielectric ceramic according to claim 2.

10. The laminated ceramic capacitor according to claim 9, wherein the internal electrodes comprise Ni.

11. A laminated ceramic capacitor comprising:
a laminated body including a plurality of laminated dielectric ceramic layers with internal electrodes disposed at different interfaces between adjacent dielectric ceramic layers, and a pair of external electrodes disposed on an outer surface of the laminated body so that each is electrically connected to a different internal electrodes,
wherein the dielectric ceramic layers comprise the dielectric ceramic according to claim 3.

12. The laminated ceramic capacitor according to claim 11, wherein the internal electrodes comprise Ni.

13. The dielectric ceramic according to claim 1 in which $x < 0.15$.

14. The dielectric ceramic according to claim 13 in which $x > 0$.

15. A laminated ceramic capacitor comprising:
a laminated body including a plurality of laminated dielectric ceramic layers with internal electrodes disposed at different interfaces between adjacent dielectric ceramic layers, and a pair of external electrodes disposed on an outer surface of the laminated body so that each is electrically connected to a different internal electrodes,
wherein the dielectric ceramic layers comprise the dielectric ceramic according to claim 14.

16. A laminated ceramic capacitor comprising:
a laminated body including a plurality of laminated dielectric ceramic layers with internal electrodes disposed at different interfaces between adjacent dielectric ceramic layers, and a pair of external electrodes disposed on an outer surface of the laminated body so that each is electrically connected to a different internal electrodes,
wherein the dielectric ceramic layers comprise the dielectric ceramic according to claim 13.

17. The laminated ceramic capacitor according to claim 16, wherein the internal electrodes comprise Ni.

18. The laminated ceramic capacitor according to claim 8, wherein the internal electrodes comprise Ni.

19. A laminated ceramic capacitor comprising:

a laminated body including a plurality of laminated dielectric ceramic layers with internal electrodes disposed at different interfaces between adjacent dielectric ceramic layers, and a pair of external electrodes disposed on an outer surface of the laminated body so that each is electrically connected to a different internal electrodes, wherein the dielectric ceramic layers comprise the dielectric ceramic according to claim 1.

20. The laminated ceramic capacitor according to claim 19, wherein the internal electrodes comprise Ni.

* * * * *